Sept. 20, 1949.   D. FINLAYSON ET AL   2,482,164
METHOD OF MAKING REINFORCED PLASTIC PRODUCTS
Filed Nov. 25, 1943
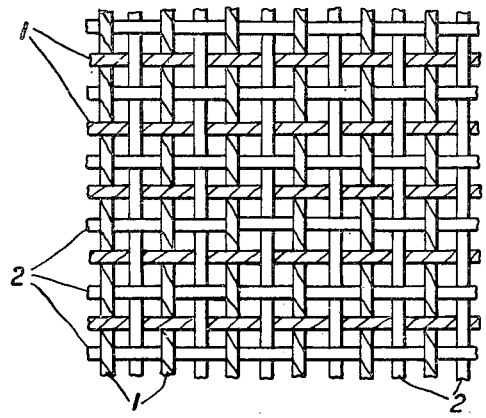
FIG. 1
FIG. 2
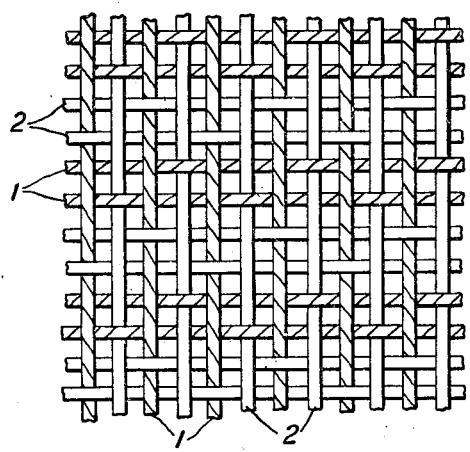
FIG. 3
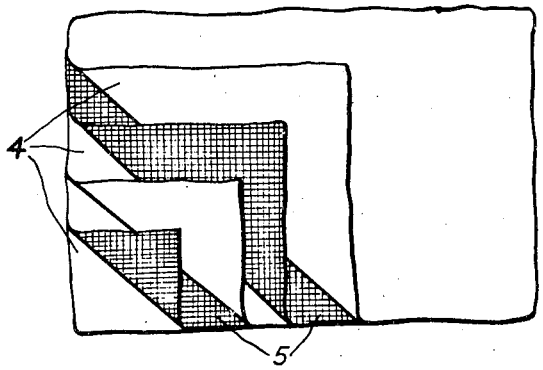
D. FINLAYSON
H. CRAWSHAW
INVENTORS
ATTORNEYS Patented Sept. 20, 1949

2,482,164

UNITED STATES PATENT OFFICE 2,482,164

METHOD OF MAKING REINFORCED PLASTIC PRODUCTS

Donald Finlayson and Harry Crawshaw, Spondon, near Derby, England, assignors, by mesne assignments, to Celanese Corporation of America, a corporation of Delaware Application November 25, 1943, Serial No. 511,719
In Great Britain November 19, 1942

Section 1, Public Law 690, August 8, 1946
Patent expires November 19, 1962

5 Claims. (Cl. 154—136)

This invention relates to articles of plastic materials, and particularly to sheets, in which a plastic of low elasticity is reinforced by means of one or more layers of textile yarns of the same order of elasticity as the plastic. By the term "a plastic" is meant an organic material or composition capable of being brought to a plastic condition in the course of its manufacture so that in that condition it may be moulded or formed into a desired shape, notwithstanding the fact that the plasticity of the material, and even its capacity for being rendered plastic, may subsequently be substantially reduced or entirely destroyed. This latter is the case, for instance, with phenol formaldehyde resins and other resins of the thermosetting type. By suitable heat treatment they can be converted into a form which does not become plastic on subsequent heating.

By the term "a plastic of low elasticity" is meant a plastic as defined above which, in contrast to rubber and rubber-like materials, does not exhibit "high elasticity" at ordinary temperatures. The term "high elasticity" is used in the sense employed by Alexandrov and Lazurkin (Acta Physicochimica U. R. S. S. 1940 12 647) or Eley (Transactions of the Faraday Society 1942 38 299) and other investigators.

A sheet material of this character may comprise a plurality of woven layers, each consisting of a set of relatively heavy yarns bound close to each other by relatively light threads, are secured together by means of an adhesive, which may be present in sufficient quantity to form smooth surfaces between which the woven layers are embedded in a body of the adhesive. Or again, the relatively light threads may themselves be coalesced so as to constitute an adhesive to secure the fabrics together, no additional body of adhesive being required. It is pointed out in this prior specification that the adhesive employed is of low elasticity, i. e. of the same order of elasticity as the material of which the heavy yarns consist. The adhesive is thus distinguished from rubber and other adhesives of sufficiently high elasticity to be employed in conjunction with rubber.

It has now been found that considerable advantages may be obtained by the use, in the production of sheets and other articles in which a plastic of low elasticity is reinforced by textile yarn of the same order of elasticity as the plastic, of auxiliary yarns adapted to hold said reinforcing yarns in the form of a coherent fabric prior to the incorporation of the yarn in the body of the plastic, and to lose their strength in the operation of moulding or otherwise forming the said plastic into the form of a sheet or other article reinforced by said reinforcing yarns. Not only does the use of auxiliary yarns that are relatively light in weight or the weaving of the fabric with the auxiliary yarns under relatively light tension enable the reinforcing yarns to lie substantially straight in the fabric used to reinforce the sheet material, but also damage of the reinforcing yarns by reason of their crossing and interlacing with one another is avoided when the moulding pressure is applied to the body of plastic in which the fabric is embedded. Since the only yarns that are interlaced with the reinforcing yarns are such as to lose their strength and yield, or be substantially destroyed under the moulding operation, these yarns cannot exert any injurious effect on the reinforcing yarns even under the severe pressure applied in moulding.

While, as noted above, the reinforcing yarns may lie substantially straight in the fabric employed according to the present invention, the waviness or sinusoidal formation arising from the woven structure of the fabric being confined to the auxiliary yarns, slight kinking of the reinforcing yarns may be obtained by placing the auxiliary yarns under some tension during weaving, and use may be made of this fact for adjusting the effective extensibility of the reinforcing yarns to correspond more exactly with the elasticity of the plastic. Thus, where the plastic, though of the same order of elasticity as the reinforcing yarns, is slightly less elastic, as may well be the case where the plastic is of a thermosetting character, the reinforcing yarns may be arranged to be as nearly straight as possible so that full advantage is taken of their inherently low elasticity. Where, on the other hand, the plastic tends to be slightly more elastic than the reinforcing yarns employed, as may be the case where a thermoplastic material such as one having a basis of cellulose acetate or other organic derivative of cellulose is used as the plastic, the reinforcing yarns may be slightly kinked by the application of tension to the auxiliary yarns during weaving so that the reinforcing yarns embedded in the plastic sheet have slightly more "give" and accommodate themselves to the slight "give" in the plastic.

The reinforcing yarns may be woven as single layers, e. g. by weaving a warp of reinforcing yarn with a weft of auxiliary yarn or vice versa, several of such single-layer fabrics being superposed, if desired, for incorporation in a single plastic sheet, preferably with the reinforcing yarns of one layer crossing those of another. It is another feature of the present invention, however, that the reinforcing yarns may be woven into a single fabric having a double layer of such yarns, the reinforcing yarns being included in both warp and weft of the fabric so that the warp yarns in one layer cross the weft yarns in the other layer at right angles. For this purpose, a method of weaving is adopted in which reinforcing yarns and auxiliary yarns are both included in both warp and weft, the relative dispositions of the different kinds of yarn and the shedding and picking plan being such that the reinforcing yarns are not interlaced with other reinforcing yarns, but are only held in the fabric structure by the presence of the auxiliary yarns.

Thus, the simplest form of fabric of this kind is a fabric of plain weave in which the reinforcing yarns alternate end and end with the auxiliary yarns in both warp and weft. In such an arrangement all the reinforcing warp yarns will lie over all the reinforcing weft yarns, never passing under any of them, and all the auxiliary warp yarns will lie over all the auxiliary weft yarns, never passing under any of them. The fabric structure which enables the reinforcing yarns to be handled as a coherent fabric arises from the fact that the auxiliary warp yarns, though passing over all the auxiliary weft yarns, pass under the reinforcing weft yarns which alternate with the auxiliary weft yarns; similarly, the auxiliary weft yarns pass under all the auxiliary warp yarns and over all the reinforcing warp yarns. In the operation of weaving however, it is generally more convenient to insert pairs of weft of the same material alternating with pairs of the other material and in this case some other weave than a plain weave must be adopted, for example a 4-shaft satin weave, the warp yarns alternating end and end as in the plain weave It is particularly convenient to employ, as in the reinforcing yarns in the plastic articles formed in accordance with the present invention, continuous filament yarns of regenerated cellulose of high tenacity, for example yarns made by stretching cellulose acetate yarns to 200–1000% of their original length while under the influence of an organic swelling agent, or of steam, or of hot water, and completely saponifying the cellulose acetate with, or without an intermediate shrinking treatment; yarns made by wet-spinning cellulose acetate with high stretch and subsequently saponifying; or yarns made by spinning viscose or cuprammonium, cellulose under high stretch. The yarns should be of tenacity at least 2 grams per denier, and preferably at least 4 grams per denier. Such yarns combine a high degree of tensile strength with a low elasticity which is of the same order as that of most commonly employed plastics other than rubber and similar highly elastic materials. As the auxiliary yarns, artificial yarns of a thermoplastic material such as cellulose acetate or other organic derivatives of cellulose may be employed, or yarns of a co-polymer of vinyl acetate and vinyl chloride, the operation of moulding or otherwise forming the plastic into the form of a sheet or other article involving the application of a high temperature such as would render the auxiliary yarns sufficiently soft to destroy their identity as yarns, or at least to nullify their tendency to cut into or distort the reinforcing yarns.

In addition to the textile reinforcing yarns, the articles according to the invention may contain metallic wires or threads (i. e. composite wires made of a number of fine wires twisted together) interspersed amongst the reinforcing textile yarns. In such a case it is desirable to treat the wires in the same manner as the reinforcing yarns, i. e. not to interlace them with one another or with the reinforcing yarns in the fabric that is embedded in the plastic material, but to rely on the auxiliary yarns to maintain the wires, as well as the reinforcing yarns, in the fabric prior to the operation of forming the article.

Any convenient plastic as above defined may be used for the purpose of the present invention, according to the properties required in the finished product; thus any of the following materials may be employed: cellulose esters and ethers, for example cellulose acetate, cellulose acetate-propionate, cellulose acetate-butyrate, cellulose acetate-stearate, cellulose acetate-palmitate, ethyl cellulose, benzyl cellulose and ethyl cellulose acetate; polymerized unsaturated artificial filament-forming substances, for example polymethyl acrylate, polyethyl acrylate, polymethyl methacrylate, polyvinyl esters and ethers, synthetic resins of the polystyrene class, and co-polymers of one or more such polymerized unsaturated compounds. The fabric may be incorporated in the plastic for moulding or otherwise forming into a sheet or other article in any suitable way according to the nature of the plastic. Thus, a solution of the substance forming the basis of the plastic may be applied to the fabric by a bath treatment or by padding or spraying, a paste or plastic mass containing the substance may be applied to the fabric by spreading, or the plastic may be employed in the form of sheets between which the fabric is sandwiched.

By way of example of woven fabrics that may be employed for the purposes of the present invention may be mentioned a range of woven fabrics of which details of the lightest and heaviest fabrics in the range are given below.

The lightest fabric comprises a warp in which auxiliary yarns of 33 denier made of continuous filaments of cellulose acetate alternate one and one with high tenacity continuous filament yarns of 30 denier formed by streaching continuous filament cellulose acetate yarns of 300 denier to 10 times their original length in the presence of wet steam or other agent adapted to facilitate stretching. The weft is constituted of similar yarns, also alternating one and one. The warps of this fabric may be spaced at 90 ends per inch and the weft at 80 picks per inch.

The heavier fabric is a plain woven fabric in which warps of 550 denier continuous filament yarn similar in character to the 30 denier yarns described above, alternate with 200 denier continuous filament cellulose acetate yarns, the weft being similarly constituted and the yarn spacing in both warp and weft being about 80 per inch.

Instead of being formed into plain-woven fabrics in which both warp and weft alternate one and one, the yarns described above may be formed into a 4-shaft satin fabric in which the warps alternate one and one and the weft yarns alternate two and two, being so disposed that the weft yarns of one type lie always over or under all the warp yarns of the same type. The weft and warp spacings in the two fabrics may be the same as in the fabrics previously described. Or again, the yarns may be woven into plain-woven fabrics in which the warp consists wholly of high tenacity yarns and the wefts wholly of the cellulose acetate yarns. In this case the warps of the finer fabric may be spaced at 96 to the inch and the wefts at 80 to the inch, while in the heavier fabric the warps are spaced at 80 to the inch and the wefts at 30 to the inch.

The fabrics referred to above together with a piece of composite sheet material made from them are diagramatically shown in the accompanying drawings in which Fig. 1 shows the structural arrangement of a plain-woven fabric, Fig. 2 shows the structure of a 4-shaft satin fabric and Fig. 3 shows a piece of sheet material reinforced with two layers of fabric.

In the plain-woven fabric shown in Fig. 1 the high tenacity reinforcing yarns are shown at 1 and the auxiliary cellulose acetate yarns at 2, the two types of yarns being distinguished from one another in that the first is shown shaded and the second plain. It will be seen that all the high tenacity weft yarns lie over all the high tenacity warp yarns and are not interlaced therewith, and similarly all the auxiliary weft yarns lie over all the auxiliary warp yarns. The coherence of the fabric structure arises from the fact that the auxiliary weft yarns, while passing over all the auxiliary warp yarns pass under the high tenacity warp yarns, and the auxiilary warp yarns while passing under the auxiliary weft yarns pass over the high tenacity weft yarns.

In the 4-shaft satin weave shown in Fig. 2, the high tenacity yarns are again shown shaded and the auxiliary yarns plain. In this case the high tenacity warp yarns alternate one and one with the auxiliary warp yarns while the high tenacity weft yarns alternate two and two with the auxiliary weft yarns. Here again, all the high tenacity warp yarns pass over all the high tenacity weft yarns, and all the auxiliary warp yarns pass over all the auxiliary weft yarns. The coherence of the fabric is assured by the fact that the auxiliary weft yarns, while passing under all the auxiliary warp yarns, pass over half the high tenacity warp yarns, and the auxiliary warp yarns, while passing over all the auxiliar weft yarns, pass under half the high tenacity weft yarns.

Fig. 3 shows a piece of sheet material in which three layers of plastic 4 are reinforced with two layers of textile fabric 5, which may be of any of the types described above. The corners of the four top layers of the composite sheet are shown turned back so as to demonstrate the structure. It will be understood however that the different layers are not separate and distinct as indicated, since the plastic will enter into the interstices of the reinforcing fabrics so as to be bonded to one another through the fabrics. Having described our invention, what we desire to secure by Letters Patent is:

1. Method of making sheets and other articles of plastic material, in which a plastic which is substantially free from rubber-like elasticity is reinforced with textile yarns of the same order of elasticity as said plastic, said method comprising incorporating in a body of the plastic a fabric comprising the reinforcing yarns together with auxiliary yarns, and then forming the plastic into the shape of the article, the temperature conditions of the forming operation causing the auxiliary yarns to lose their strength, said fabric comprising both reinforcing and auxiliary yarns in both warp and weft, the reinforcing yarns not being interlaced with one another but depending for their retention in the fabric structure upon the auxiliary yarns.

2. Method of making sheets and other articles of plastic material in which a plastic which is substantially free from rubber-like elasticity is reinforced with high tenacity textile yarns of regenerated cellulose comprising incorporating in a body of the plastic a coherent fabric comprising reinforcing yarns and auxiliary yarns of a thermoplastic material in both warp and weft, the reinforcing yarns not being interlaced with one another, and then forming the plastic into the shape of the article, the temperature conditions of the forming operation causing the auxiliary yarns to lose their strength, said auxiliary yarns being adapted to hold said reinforcing yarns in the form of a coherent fabric prior to the incorporation of the fabric.

3. Method of making sheets and other articles of plastic material in which a plastic which is substantially free from rubber-like elasticity is reinforced with textile yarns of regenerated cellulose said reinforcing yarns being formed from continuous cellulose acetate filaments which have been stretched so as to impart a high tenacity to them and then saponified, comprising incorporating in a body of the plastic a fabric comprising the reinforcing yarns together with auxiliary continuous-filament yarns of cellulose acetate, the reinforcing yarns and auxiliary yarns alternating one-and-one in the warp and two-and-two in the weft, and then forming the plastic into the shape of the article, the temperature conditions of the forming operation causing the auxiliary yarns to lose their strength, said auxiliary yarns being adapted ot hold said reinforcing yarns in the form of a coherent fabric prior to the incorporation of said fabric.

4. Method of making sheets and other articles of plastic material in which a plastic which is substantially free from rubber-like elasticity is reinforced with textile yarns of regenerated cellulose said reinforcing yarns being formed from continuous cellulose acetate filaments which have been stretched so as to impart a high tenacity to them and then saponified, said method comprising incorporating in a body of the plastice a fabric comprising the reinforcing yarns together with auxiliary continuous-filament yarns of cellulose acetate, said auxiliary yarns being woven into the fabric under very light tension so that the reinforcing yarns lie substantially straight in the fabric structure, and then forming the plastic into the shape of the article, the temperature conditions of the forming operation causing the auxiliary yarns to lose their strength, said auxiliary yarns being adapted to hold said reinforcing yarns in the form of a coherent fabric prior to the incorporation of said fabric.

5. Method of making sheets and other articles of plastic material in which textile yarns are used to reinforce a plastic of slightly greater elasticity than the reinforcing yarns of regenerated cellulose, said reinforcing yarns being formed from continuous cellulose acetate filaments which have been stretched so as to impart a high tenacity to them and then saponified said method comprising incorporating in a body of the plastic a fabric comprising the reinforcing yarns together with auxiliary continuous-filament yarns of cellulose acetate, said auxiliary yarns being woven into the fabric under sufficient tension to give the reinforcing yarns a slightly wavy form in said fabric, and then forming the plastic into the shape of the article, the temperature conditions of the forming operation causing the auxiliary yarns to lose their strength, said auxiliary yarns being adapted to hold said reinforcing yarns in the form of a coherent fabric prior to the incorporation of said plastic.

DONALD FINLAYSON.
HARRY CRAWSHAW.

REFERENCES CITED

The following references are of record in the file of this patent:

UNITED STATES PATENTS

| Number    | Name    | Date          |
|-----------|---------|---------------|
| 1,236,685 | Dew     | Aug. 14, 1917 |
| 1,383,694 | Bolton  | July 5, 1921  |
| 2,147,736 | Dreyfus | Feb. 21, 1939 |
| 2,252,999 | Wallach | Aug. 19, 1941 |